July 7, 1953            J. CRYNS            2,644,444
BAKING FRAME
Filed March 2, 1950
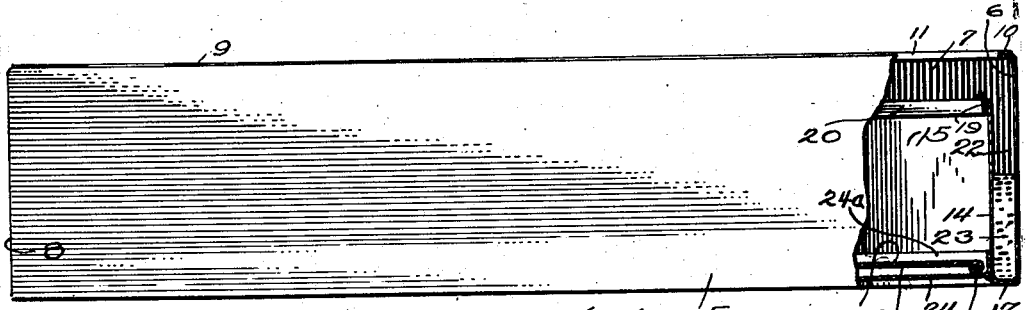
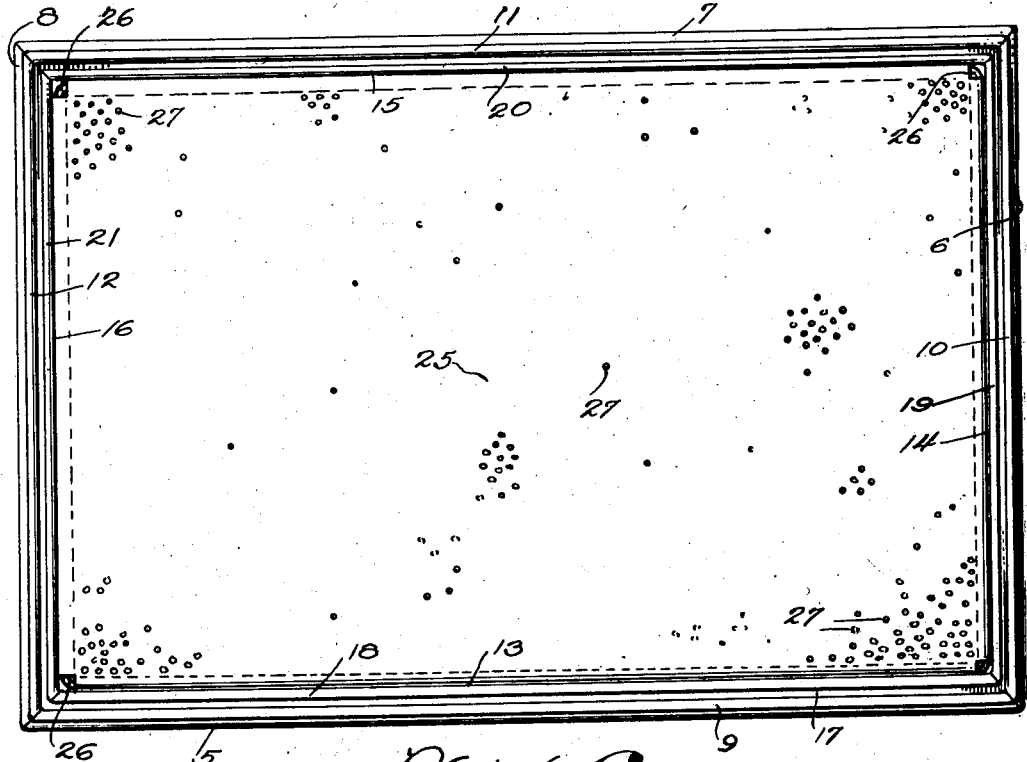
INVENTOR
Joseph Cryns
BY W. J. Eccleston
ATTORNEY Patented July 7, 1953

2,644,444

UNITED STATES PATENT OFFICE 2,644,444

BAKING FRAME

Joseph Cryns, Chicago, Ill.

Application March 2, 1950, Serial No. 147,313

1 Claim. (Cl. 126—369)

(Granted under Title 35, U. S. Code (1952), sec. 266)

The invention described herein, if patented, may be manufactured and used by or for the Government for governmental purposes, without the payment to me of any royalty thereon.

This invention relates to baking frames or pans in which cakes, puddings, etc., are simultaneously steamed and baked.

The principal object of the invention is the provision of a baking frame which will preclude the burning of the sides and tops of the puddings, cakes, etc. while permitting thorough baking of the same. Further objects are to provide a baking frame which is of sturdy construction so that it will give long service, which is of light weight so that it may be easily handled, and which may be used with standard bakers' equipment, without modification. Other objects will be understood from the following description of the preferred embodiment of the invention shown in the accompanying drawings forming a part of this specification.

In said drawings,

Fig. 1 is a side elevation partly in vertical section of the improved baking frame; and Fig. 2 is a top plan view of the same.

Referring particularly to the drawings, the baking frame is preferably a rectangular vessel having four vertical outside walls 5, 6, 7 and 8 which are welded or otherwise secured together at the four corners to make a water-tight connection. The upper edges of said walls are bent inwardly to provide the strengthening beads 9, 10, 11, 12 respectively. Four inner walls 13, 14, 15, 16 are spaced a short distance from the outer walls and are joined thereby by a bottom web 17. The abutting edges of the inner walls are also welded together or otherwise secured to make the four inner corners water-tight. The inner walls are not quite as high as the outer walls and have strengthening beads 18, 19, 20, 21 respectively at their upper edges. Thus a narrow chamber or reservoir 22 is provided to contain water 23 entirely surrounding the shell provided by the four inner walls of the baking frame.

In a typical baking frame embodying the invention, the outer walls may be approximately 16 in. x 24 in. x 5¼ in., while the inner walls are spaced one-half inch from the inside surfaces of the outer walls and are only 4¼ in. high. These walls and the web 17 may be made from a single piece of sheet aluminum (.051–52s ¼ H) cut, bent and welded to make the rectangular structure shown in the drawings.

Secured within this rectangular structure is a flat bottom wall 24 having flanges 24a upstanding therefrom to permit welding the bottom wall at its perimeter to the inside surfaces of the inner walls 13, 14, 15, 16, the preferred arrangement being such that bottom surface of the bottom wall is spaced a slight distance—say one-eighth inch, above the bottom surface of web 17. This greatly reduces the contact area of the baking frame, reducing friction and making it easier to slide the baking frame over the bottom of an oven. At the same time the heat from the oven bottom is able to pass through the small air space without serious loss due to the insulating effect of an air space. Resting on and removable from the bottom wall 24 is a perforated rectangular, flat tray or "cookie sheet" 25 having its perimeter curled around four reinforcing rods 26, only one of which is shown. It will be understood that the tray 25 is initially larger than the space within the four inner walls of the baking frame, but the edges of the tray are each rolled over a rod 26 to secure the rod against movement. Thus the tray is greatly stiffened and strengthened at its edges, where it is likely to take blows, and this being the case, it may be made of light gauge metal, that is, materially lighter than the walls 5—8 and 13—6. The curled edges of the tray also serve as spacing means, keeping the tray spaced about one-fourth inch above the bottom wall 24, as shown. With the perforations 27 arranged four to the inch, the tray 25 may be used satisfactorily for baking cookies; for other products, other arrangements of perforations may be employed. Obviously for some products the tray 25 may be dispensed with.

In use the dough is placed on the tray 25 and water is poured into chamber 22, the tray is then put inside the baking frame and the latter is placed in the oven. Heat from the oven is transmitted principally through the bottom wall 24 to the underside of the tray, thence to the products being baked. Heat also is transmitted to the outer walls which heat the water 23 in the chamber until it vaporizes as steam. The inner walls are thus protected by a water barrier or leg against excessive heat, which might burn the product. As the steam rises above the top of the frame, it is directed inwardly by the inwardly bent edges 9, 10, 11, 12, so that a protective mist of water vapor moves over the product, thus precluding burning the product by heat radiated from above. Therefore the described baking frame is well adapted for preventing excessive loss of moisture by the products and for obviating burning the sides and tops of cakes, puddings, etc.

Having described the invention, what I claim as new and desire to secure by Letters Patent is:

A baking frame consisting of a body completely open at the top and having a flat bottom and spaced vertical side walls extending around the entire perimeter of the body; said body also including a bottom web which joins the spaced vertical side walls and which lies substantially in a horizontal plane slightly below the level of said flat bottom so that the bottom web will support the body with its flat bottom slightly spaced above the support for the body; said spaced side walls and bottom web together providing a narrow continuous water-tight water compartment completely surrounding said flat bottom; said spaced side walls being separated at their tops, the inner side walls being of less height than the outer side walls, the outer side walls being inwardly bent at their upper edges to direct steam inwardly; the bottom wall being adapted to support food products for baking and the entire area above said bottom wall being open; the body being so constructed and arranged that when water is put in said water compartment and the body is placed in a heated oven, the water will vaporize and the steam will form a continuous layer or blanket over the product being baked, thereby obviating excessive loss of moisture of the product and precluding burning the same.

JOSEPH CRYNS.

References Cited in the file of this patent

UNITED STATES PATENTS

| Number | Name | Date |
| --- | --- | --- |
| 448,886 | Perry | Mar. 24, 1891 |
| 634,557 | Halstead | Oct. 10, 1899 |
| 1,157,991 | Linton | Oct. 26, 1915 |
| 1,159,132 | Thompson | Nov. 2, 1915 |
| 1,461,092 | Ivancic | July 10, 1923 |
| 1,673,164 | Silen | June 12, 1928 |
| 1,948,124 | Morgan | Feb. 20, 1934 |
| 2,462,362 | Christensen | Feb. 22, 1949 |